J. L. CREVELING.
ELECTRIC REGULATION.
APPLICATION FILED JAN. 5, 1910.
1,144,299.
Patented June 22, 1915.
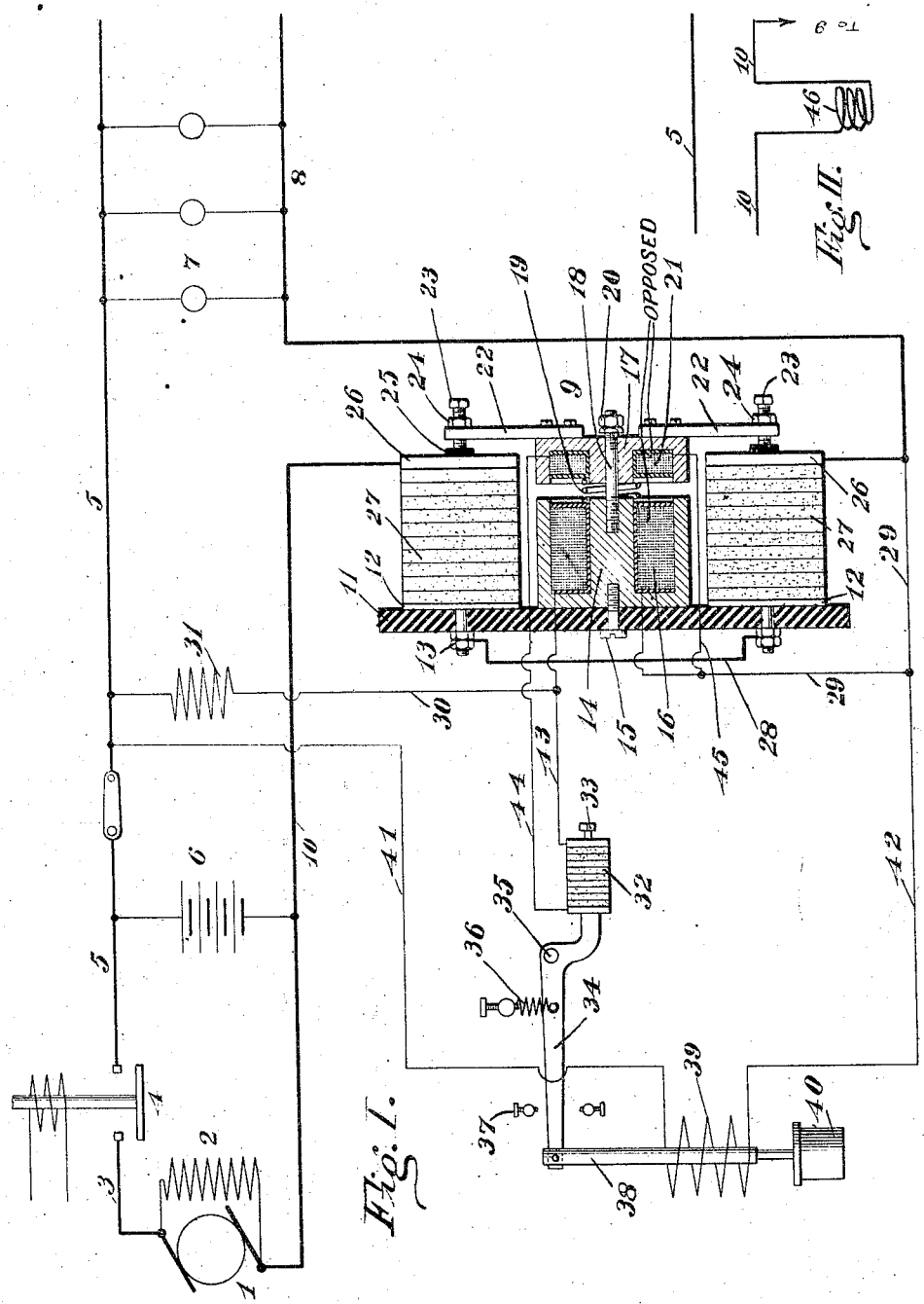
WITNESSES:
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,144,299.  Specification of Letters Patent.  Patented June 22, 1915.

Application filed January 5, 1910. Serial No. 536,506.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to automatically regulate an electric circuit in a desired manner.

My invention has for its particular object to provide means whereby the voltage across an electric circuit or current flowing therein may be automatically governed in a predetermined manner.

As my invention is particularly applicable to systems of electric regulation in which it is desired to maintain a constant voltage upon lamps or other translation devices operated from a source of current subject to variations in voltage, it will be described with reference to such a system.

Figure I is a diagrammatic view of a system comprehending my invention wherein the same operates to hold the voltage constant. Fig. II is a diagrammatic representation of a portion of a system wherein my invention may be employed to hold the current in a circuit constant.

Referring to Fig. I, 1 represents a dynamo or generator provided with the usual field coil 2. 3 represents the positive lead of the generator which may be carried to one side of any suitable type of automatic switch indicated at 4 adapted to close the generator circuit when its voltage shall reach a predetermined point and open the same when its voltage shall have fallen to a predetermined point as may be desired. The other side of the switch is connected to the main 5 in communication with one side of the storage battery 6 and one side of the lamps or translating devices indicated at 7. The other side of the translating devices is connected with the main 8 which is carried to the regulator 9 from which return to the generator is made through lead 10 which is in communication with the negative side of the storage battery 6. 11 represents the base of the regulator 9 upon which are mounted metallic conducting plates 12 which are fastened thereon by means of studs and nuts 13. 14 represents a magnet, in this instance shown as of the iron clad type, attached to the base 11 as by means of screw 15 and provided with a winding 16 and armature 17 free to move upon the rod 18 carried by the magnet 14 and made of non-magnetic material. 19 represents a spring tending to press the armature 17 away from the magnet 14 and the limit of travel of the armature upon the rod 18 may be determined as by nuts 20. 21 represents a winding which may be carried upon the armature 17 or otherwise placed in operative relation to the magnet 14 for a purpose which will hereinafter be explained. The armature 17 is provided with arms 22 carrying screws 23, the position of which may be locked as by jam nuts 24. The screws 23 carry insulating members 25 which are attached to conducting plates 26. Between the conducting plates 12 and the conducting members 26 are placed regulating units in this instance indicated as disks or contacting electrodes as, for example, carbon plates or disks in such manner that the pressure upon the disks or other regulating means 27 will vary as the pull of the magnet 14 upon its armature 17 varies. In the drawing I have shown two piles of contacting electrodes or regulating elements but it will be obvious that any number may be employed. In practice I find it usually advantageous to use three such piles, then pressure applied at a central point is easily distributed to the three members. In Fig. I the members 13 are shown as electrically connected as by means of the wire 28 and it will be obvious that if the members 26 be connected into an electric circuit that the conditions of the same will be modified upon changes in pressure exerted upon the members 27 as, for example, when the magneto-motive force of the magnet 14 be changed. The winding 16 has one of its ends connected with the main 8 by means of the wire 29 and the other end connected with the main 5 as by means of the wire 30 through the resistance 31, the function of which will hereinafter appear. 32 represents a resistance varying element in this instance shown as a pile of contacting electrodes, for example, carbon disks, the resistance of which will vary under variations in pressure. The resistance element 32 is placed between the adjustable screw 33 and the lever 34 pivoted at 35 and normally pulled in an upward direction as by adjustable spring 36. 37 represents stops for limiting the travel which may be given to the lever 34. The lever 34 is provided at its extremity with a core of magnetic material represented at 38 and which is surrounded by the solenoid or coil 39 which is connected with the main 5 as by wire 41 and with the main 8 as by wires 42 and 29. 40 represents a dash-pot which may be used if desired to prevent too sudden motion of the core 38. The spring 36, by tending to lift the lever 34, tends to increase the resistance of the member or element 32 while current in the solenoid 39 tends to draw the core 38 downwardly in such manner as to decrease the resistance of the element 32. The resistance varying element 32 is connected with the wire 30 as by means of wire 43 and with one end of the winding 21 as by means of wire 44. The opposite end of the coil 21 is connected with the wire 29 as by means of wire 45, thus it will be obvious that the element 32 is connected in series with the coil 21 and these both connected in shunt across the coil 16. Therefore, as the resistance of the member 32 decreases less current will flow through the winding 16 as more will be shunted away from the same and this current so shunted away from the winding 16 will flow through the winding 21 so as to increase the magneto-motive force thereof. The resistance 31 will limit the total amount of current which will flow through the windings as the resistance 32 is lowered. The windings 16 and 21 are so arranged that their magneto-motive forces oppose each other for a purpose which will hereinafter be more plainly brought out.

The operation of my improvement in electric regulation is substantially as follows: Referring to Fig. I, if the generator be at rest or running at very low speed the switch 4 will be open and the storage battery 6 will supply current to the lamps or translating devices 7 which current may be considered as flowing from the battery to the main 5 and returning through the main 8, regulator 9 and main 10 to the battery. The current flowing through the regulator 9 may be considered as entering the lower conducting member 26 and then passing through the resistance varying element 27 to the conducting plate 12, then through stud 13 and wire 28 to the upper stud 13, then through upper plate 12 and resistance varying element 27 to the upper conducting member 26. It will be obvious that the resistance of the members 27 will determine the voltage impressed upon the translation devices 7 and if this resistance be properly varied the voltage impressed upon the translating devices 7 may be held constant throughout reasonable changes in voltage of the storage battery 6. It will also be obvious that the resistance of the members 27 may be caused to vary by variations in pressure exerted thereupon, as for instance, the pressure exerted by the attraction of the armature 17 by the magnet 14. Under the above outlined conditions current will also flow from the main 5 through wire 29 to the lead 8. This current will energize the magnet 14 and attract the armature 17 and tend to reduce the resistance of the members 27 by exerting pressure thereupon. Some current will also flow from the main 5 through the wire 41, solenoid 39 and wire 42 to the lead 8 and thus the current in the coil 39 will be subject to changes in voltage impressed upon the translation circuit. I so adjust the spring 36 that when the desired voltage is reached upon the translation devices 7, for example, the normal discharge voltage of the battery 6, the coil 39 will cause the core 38 to be lowered and pressure to be exerted upon the resistance element 32 so as to lower the resistance thereof and cause some current to flow from the wire 30 through wire 43, resistance 32, wire 44, coil 21 and wire 45 to wire 29. This circuit being in shunt to the winding 16 and both of these being in series with the resistance 31, decrease in resistance 32 will weaken the current in the coil 16 and therefore lessen the attractive effort of the magnet 14 which in turn will lessen the pressure upon the disks 27 and tend to increase the resistance in circuit with the translation devices and prevent a rise in voltage thereupon. To increase this effect I wind the coil 21 in such manner that the current shunted from the coil 16 in traversing the coil 21 will set up a magneto-motive force opposed to that of the coil 16. Therefore, the current shunted away from the coil 16 will not only weaken the same in that manner but will act to strengthen the coil 21 and thus oppose or further weaken the effect of the coil 16. If the generator be brought up to speed and the switch 4 closed current will flow therefrom to the lamps or translating devices and as this will decrease the current taken from the storage battery the voltage across the line will rise and the voltage across the translation devices will also tend to rise. This will cause an increase in the current in the coil 39 which will draw down the core 38 so as to further decrease the resistance 32 and weaken the coil 16 and strengthen the opposing action of the coil 31 so as to decrease the pressure upon the resistance 27 and increase the resistance thereof so as to tend to lower the voltage across the translation devices. This action will cause the voltage to be lowered until the normal voltage for which the spring 36 is set is reached and thus the voltage across the translation devices will be held constant throughout rises in voltage caused by increase of current from the generator. If now the generator slow down the voltage across the mains will decrease and the voltage across the translation devices will tend to decrease therewith. A very slight drop, however, in voltage across the translation devices will cause the coil 39 to weaken and the resistance 32 to be increased and the coil 16 strengthened and the coil 21 weakened so as to increase the pressure upon the disks 27 and decrease the resistance thereof to compensate for the tendency toward fall in voltage across the translation devices. By proper arrangement of the parts set forth in Fig. I the voltage across the translation devices may be held substantially constant within an extremely narrow margin. In practice I find it advantageous to make the air gap between the magnet 14 and the armature 17 very small when the disks 27 are compressed to the maximum so that a very strong pull is exerted upon the armature 17 and the disks placed under considerable pressure without consumption of any large current in the coil 16. If it be desired to hold the current in the line constant for any particular reason as, for instance, when operating arc lamps, the same type of device as shown in Fig. I may be used with exception that the series coil 46 in Fig. II is placed around the core of the solenoid 38 instead of the shunt or volt meter coil 36, the action of which is a function of current in the line rather than voltage across the same. As the other parts of the system will be identical with Fig. I they are omitted in Fig. II for the sake of simplicity.

I do not wish in any way to limit myself to the exact construction or details of operation set forth in the above description which is merely a description of one form of system embodying the elements of my invention which is as set forth in the following claims:

1. A regulating system comprising a generator and a work circuit, a regulating device for said work circuit, the action of which is varied by pressure exerted thereon, electromagnetic means for exerting pressure thereon, electromagnetic means for decreasing said pressure, and automatic means for governing the joint operation of said means.

2. A regulating system comprising a generator and a work circuit, a regulating device for said circuit, the action of which is altered by variations in pressure thereon, electromagnetic means for exerting pressure thereon, electromagnetic means modifying said pressure, and automatic means for controlling said pressure exerting and said modifying means.

3. A regulating system comprehending a generator and a work circuit, a regulating device for said work circuit, the action of which is altered by variations in pressure thereon, electromagnetic means for exerting pressure thereon, electromagnetic means tending to decrease said pressure, and automatic means for governing said electromagnetic means.

4. A regulating system comprising a generator and a work circuit, a regulating device for said work circuit comprising an element the effect of which is varied by variations in pressure thereupon, electromagnetic means for exerting said pressure, electromagnetic means coöperating with the first means tending to modify said pressure, and automatic means responsive to variations in the conditions of said circuit adapted to vary the combined operation of the said electromagnetic means.

5. A regulating system comprising a generator and a work circuit, a regulating device for said work circuit, the effect of which is altered by variations in pressure thereupon, electromagnetic means for exerting said pressure, electromagnetic means for decreasing said pressure, and automatic means affected by changes in said circuit governing both the said electromagnetic means.

6. A regulating system comprising a generator and a work circuit, a regulating device for the work circuit comprising an element the effect of which is altered by variations in pressure thereupon, means for exerting said pressure, comprehending a plurality of windings, and automatic means for determining the current in said windings.

7. A regulating system comprising a generator and a work circuit, a regulating device in said circuit, electromagnetic means for said device comprising a plurality of windings, and means for governing said electromagnetic means comprising a variable resistance shunt around one of said windings for varying the current in said windings.

8. A regulating system comprising a generator and a work circuit, a regulator for said circuit, electromagnetic means for operating said regulator comprising a plurality of windings, and means for governing said windings comprising a variable shunt around one of said windings and in series with another of said windings for simultaneously varying the current in all of said windings.

9. A regulating system comprising a generator and a work circuit, a regulator for said circuit, electromagnetic means tending to decrease the current opposing effect of said regulator, resilient means tending to increase the current opposing effect of said regulator, electromagnetic means coöperating therewith to increase said effect, and automatic means governed by the conditions in the circuit for controlling said electromagnetic means.

10. A regulating system comprising a generator and a work circuit, a work circuit containing translating devices, a regulator for said translating devices, electromagnetic means normally tending to operate said regulator to increase the voltage upon the translating devices, electromagnetic means coöperating therewith to decrease the effect of said last mentioned means, and automatic means for governing the joint effect of the electromagnetic means.

11. A regulating system comprising a generator and a work-circuit, a regulating device for the work circuit comprehending an element the effect of which is altered by variations in pressure thereupon, means for exerting said pressure comprehending a winding energized by said circuit, means coöperating therewith comprising a winding also energized by said circuit, and automatic means for varying the current in said windings.

12. A regulating system comprising a generator and a work circuit, containing translation devices, a regulator for said devices comprising an element the effect of which is altered by variations in pressure thereon, electromagnetic means normally tending to increase said pressure, electromagnetic means tending to modify the effect of the said last mentioned means, and automatic means governed by the conditions of said circuit to weaken the first mentioned electromagnetic means and strengthen the other electromagnetic means upon predetermined changes in the conditions of said circuit.

13. A regulating system comprising a generator and a work circuit, a regulator for said circuit including a plurality of contacting members adapted when compressed to increase the voltage of said circuit, electromagnetic means normally tending to compress said members, electromagnetic means for varying the effective strength of the first mentioned electromagnetic means, and automatic means for controlling both electromagnetic means.

14. In an electric circuit, the combination of regulating means the action of which is varied by pressure exerted thereon; electromagnetic means for exerting said pressure; and electromagnetic means for modifying said pressure in parallel with the first-named electromagnetic means.

15. In an electric circuit, the combination of regulating means the action of which is varied by pressure exerted thereon; electromagnetic means for exerting said pressure; electromagnetic means for modifying said pressure in parallel with the first electromagnetic means; and automatic means for governing the joint operation of said means.

16. A regulating system comprising a generator and a work circuit, regulating means for the work circuit, the effect of which is varied by pressure exerted thereupon, electromagnetic means for exerting pressure upon said regulating means, and electromagnetic means for modifying said pressure in parallel with the first named electromagnetic means, both of said electromagnetic means being energized by said circuit.

17. A regulating system comprising a generator and a work circuit, regulating means for the work circuit the action of which is varied by pressure thereon, electromagnetic means for exerting pressure upon said regulating means, electromagnetic means for modifying said pressure in parallel with the first mentioned electromagnetic means, and automatic means for governing the joint operation of said electromagnetic means, said automatic means and both of said electromagnetic means being energized by said circuit.

JOHN L. CREVELING.

Witnesses:
E. Hall,
M. Herskovitz.